(12) United States Patent
Beerends et al.

(10) Patent No.: US 7,366,663 B2
(45) Date of Patent: Apr. 29, 2008

(54) MEASURING A TALKING QUALITY OF A TELEPHONE LINK IN A TELECOMMUNICATIONS NETWORK

(75) Inventors: John Gerard Beerends, Hengstdijk (NL); Andries Pieter Hekstra, Eindhoven (NL); Symon Ronald Appel, Haarlem (NL)

(73) Assignee: Koninklijke KPN N.V., The Hague (NL)

( * ) Notice: Subject to any disclaimer, the term of this patent is extended or adjusted under 35 U.S.C. 154(b) by 810 days.

(21) Appl. No.: 10/398,263

(22) PCT Filed: Oct. 11, 2001

(86) PCT No.: PCT/EP01/11777

§ 371 (c)(1),
(2), (4) Date: Jul. 30, 2003

(87) PCT Pub. No.: WO02/39707

PCT Pub. Date: May 16, 2002

(65) Prior Publication Data
US 2004/0042617 A1    Mar. 4, 2004

(30) Foreign Application Priority Data
Nov. 9, 2000    (EP) ............................. 002039360

(51) Int. Cl.
*G10L 15/00* (2006.01)
(52) U.S. Cl. ............... 704/231; 455/452.2; 455/67.13; 455/135; 455/161.3
(58) Field of Classification Search ............ 455/452.2, 455/67.13, 135, 161.3; 702/69; 704/231, 704/233
See application file for complete search history.

(56) References Cited

U.S. PATENT DOCUMENTS

| | | | |
|---|---|---|---|
| 4,449,238 A * | 5/1984 | Lee et al. | 381/110 |
| 4,677,676 A | 6/1987 | Eriksson | 381/71 |
| 5,001,703 A * | 3/1991 | Johnson et al. | 370/280 |
| 5,386,465 A * | 1/1995 | Addeo et al. | 379/202.01 |

(Continued)

FOREIGN PATENT DOCUMENTS

WO    WO 98/59509    12/1998

OTHER PUBLICATIONS

Saeed V. Vaseghi et al, "Noise Compensation Methods for Hidden Markov Model Speech Recognition in Adverse Environments", IEEE Transactions on Speech and Audio Processing, vol. 5, No. 1, Jan. 1997, pp. 11-21.

*Primary Examiner*—Michael Opsasnick
(74) *Attorney, Agent, or Firm*—Michaelson & Associates; Peter L. Michaelson

(57) ABSTRACT

For measuring the influence of noise on the talking quality of a telephone link in a telecommunications network, a talker speech signal (s(t)) and a degraded speech signal (s'(t)) are fed to an objective measurement device for obtaining an output signal (q) representing an estimated value of the talking quality. The degraded signal includes a returned signal (r(t)) originating from the network during transmission of the talker speech signal over the telephone link. The objective measurement provided by the device is a modified PSQM-like measurement, which is modified to include modelling of masking effects resulting from noise present in the returned signal. Preferably, the modelling includes noise suppression performed on a difference signal (D(t,f)) in a loudness density domain using noise estimation.

11 Claims, 4 Drawing Sheets

U.S. PATENT DOCUMENTS

Figure 1:
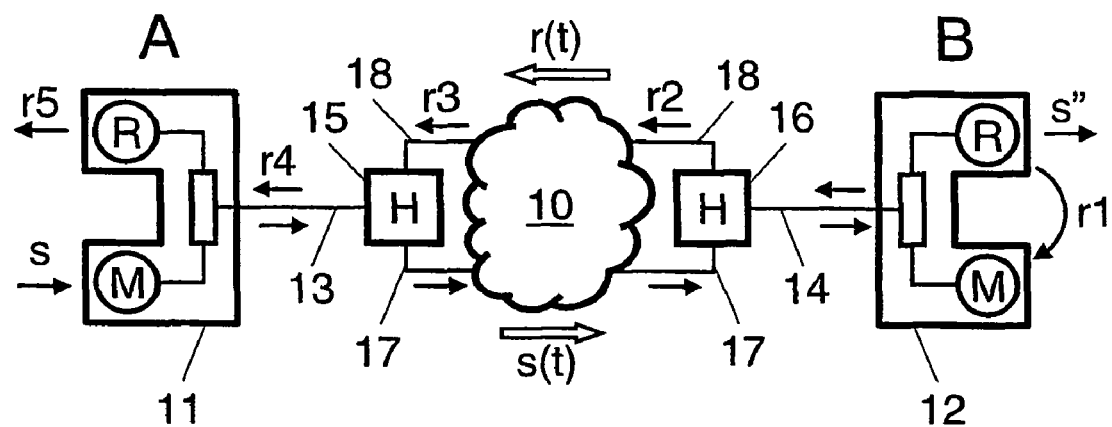

| | | | |
|---|---|---|---|
| 5,414,796 A | * | 5/1995 | Jacobs et al. ............... 704/221 |
| 5,649,299 A | * | 7/1997 | Battin et al. ................. 455/62 |
| 5,848,384 A | * | 12/1998 | Hollier et al. .............. 704/231 |
| 5,933,506 A | * | 8/1999 | Aoki et al. ................. 381/151 |
| 6,070,075 A | * | 5/2000 | Kim ........................... 455/437 |
| 6,484,138 B2 | * | 11/2002 | DeJaco ....................... 704/221 |

\* cited by examiner

MEASURING A TALKING QUALITY OF A TELEPHONE LINK IN A TELECOMMUNICATIONS NETWORK

A. BACKGROUND OF THE INVENTION

1. Field of the Invention

The invention lies in the area of measuring the quality of telephone links in telecommunications systems. More in particular, it concerns measuring a talking quality of a telephone link in a telecommunication network, i.e. measuring the influence of returned signals such as echo disturbances and side tone distortions on the perceptual quality of a telephone link in a telecommunications system as subjectively observed by a talker during a telephone call.

Such a method and a corresponding device are described in the not timely published international patent application PCT/EP00/08884 (Reference [1]; for more bibliographical details relating to the references, see below under D.), which is incorporated by reference in the present application. According to the described method and device for measuring the influence of echo on the perceptual quality on the talker's side of a telephone link in a telecommunications network, a talker speech signal and a combined signal are fed to an objective measurement device, such as a PSQM system, for obtaining an output signal representing an estimated value of the perceptual talking quality. The combined signal is a signal combination of a returned signal originating from the network and corresponding to the talker speech signal, and the talker speech signal itself. The described technique has the following problem. In case the returned signal contains signal components not directly related to the voice of the talker, like noise present in the telephone system, noise derived from the background noise of the talker at the other side of the telephone connection, or noise derived from interfering signals, such signal components may have a so-called masking effect, on the echo, which then results in an increase of the subjectively perceived talking quality. Objective measurement systems such as based on the Perceptual Speech Quality Measurement (PSQM) model, recommended by the ITU-T Recommendation P.861 (see Reference [2]), or on the Perceptual Evaluation of Speech Quality (PESQ), recommended by the ITU-T Recommendation P.862 (see Reference [3]), however, will interpret noise components generally in terms of a decrease in quality. An application of an objective measurement such as PSQM in an objective measurement of the quality of speech signals received via radio links is, e.g., disclosed in Reference [4]. The mentioned problem may be tried to be solved by using noise suppression or attenuation techniques as generally known in the world of speech processing (see e.g., References [5],-,[8]) or of acoustic systems (see Reference [9]). However, these known suppression or attenuation techniques are developed for optimizing listening quality, and are not suited for the measurement and optimization of talking quality. Talking quality differs from listening quality, especially in the effect of masking noise and masking by one's own voice. Noise in general decreases listening quality but increases talking quality.

B. SUMMARY OF THE INVENTION

An object of the present invention is to provide for an objective measurement method and corresponding device for measuring a talking quality of a telephone link in a telecommunication network, i.e. for measuring the influence of returned signals such as echo, side tone distortion, including the influence of noise, on the perceptual quality on the talker's side of the telephone link, which do not possess this problem.

According to a first aspect of the invention a method for measuring a talking quality of a telephone link in a telecommunications network, comprises a main step of subjecting a degraded speech signal, with respect to a talker speech signal, to an objective measurement technique, and producing a quality signal. The degraded speech signal includes a returned signal, which corresponds to a signal occurring in a return channel of the telephone link during the transmission of the talker speech signal in a forward channel of the telephone link. The main step includes a step of modelling masking effects in consequence of noise present in the returned signal.

According to another aspect of the invention a device for measuring a talking quality of a telephone link in a telecommunications network, comprises measurement means for subjecting a degraded speech signal with respect to a talker speech signal to an objective measurement technique, and for producing a quality signal. The degraded speech signal includes a returned signal, which corresponds to a signal occurring in a return channel of the telephone link during the transmission of the talker speech signal in a forward channel of the telephone link. The measurement means include means for a modelling of masking effects in consequence of noise present in the returned signal.

The invention is, among other things, based on the appreciation that objective measurement systems such as PSQM an PESQ, have been developed for measuring the listening quality of speech signals. Therefore, in order to provide a similar objective measurement for measuring the talking quality of a telephone link, the step of modelling echo masking effects is introduced in the objective measurement method and device.

According to one of the known measurement systems (i.c. PSQM) at first a speech signal, which is an output signal of an audio- or speech processing or transporting system, and of which the signal quality has to be assessed, and a reference signal are mapped to representation signals of a psycho-physical perception model of the human auditory system. These representation signals are, in fact, the compressed loudness density functions of the speech and reference signals. Then, two operations, which imply an asymmetry processing and a silent interval weighting in order to model two cognitive effects, are carried out on a difference signal of the two representation signals in order to produce the quality signal which is a measure for the auditory perception of the speech signal to be assessed. However, it is known that noise in the echo signal, especially background noise originating at the side of the B subscriber of the telephone link, can have a masking effect on the echo signal, thus leading to an improvement of the subjectively perceived talking quality. Then, it was realized that in the operations carried out on the difference in the algorithm, noise in the echo signal will be interpreted as an introduced distortion, leading to a deterioration of the objectively measured talking quality, and therefore these operations should be modified and/or supplemented by a step of modelling echo masking effects of noise. The same applies to the other of the mentioned known measurement techniques (i.c. PESQ).

A further object of the present invention is therefore to adapt the mentioned known objective measurement methods and devices in order to be suitable for objectively measuring the talking quality.

According to a further aspect of the invention the method comprises first and second processing steps for processing the degraded speech signal and the talker speech signal and generating first and second representation signals, respectively. The method further comprises a combining step of combining the first and second representation signals as to produce the quality signal. The first representation signal is a representation signal of a signal combination of the talker speech signal and the returned signal, and the combining step includes the step of modelling masking effects in consequence of noise present in the returned signal.

According to a still further aspect of the invention the device comprises first and second processing means for processing the degraded speech signal and the talker speech signal, and generating first and second representation signals. The device comprises further combining means for combining the first and second representation signals as to produce the quality signal. The combining means include the means for modelling the masking effects.

C. REFERENCES

[1] PCT/EP00/08884 (of applicant; filing date: Aug. 9, 2000);
[2] ITU-T recommendation P.861: Objective quality measurement of telephone band (330-3400 Hz) speech codecs, August 1996;
[3] ITU-T Recommendation P.862 (February 2001), "Perceptual evaluation of speech quality (PESQ), an objective method for end-to-end speech quality assessment of narrow-band telephone networks and speech codecs", February 2001.
[4] WO 98/59509;
[5] R. Le Bouquin, "Enhancement of Noisy Speech Signals: Applications to Mobile Radio Communications", Speech Communication, vol. 18, pp. 3-19 (1996);
[6] J.-H Chen and A. Gersho, "Adaptive Postfiltering for Quality Enhancement of Coded Speech", IEEE Trans. on Speech and Audio Processing., vol. 3, pp. 59-71 (1995 January);
[7] D. E. Tsoukalas, J. Mourjopoulos and G. Kokkinakis, "Perceptual Filters for Audio Signal Enhancement", J. Audio Eng. Soc., vol. 45, pp. 22-36 (1997 January/February);
[8] F. Xie and D. van Compernolle, "Speech Enhancement by Spectral Magnitude Estimation—A unifying Approach", Speech Communication, vol. 19, pp. 89-104 (1996);
[9] U.S. Pat. No. 4,677,676.

The references [1],-,[9] are incorporated by reference in the present application.

D. BRIEF DESCRIPTION OF THE DRAWING

Figure 2:
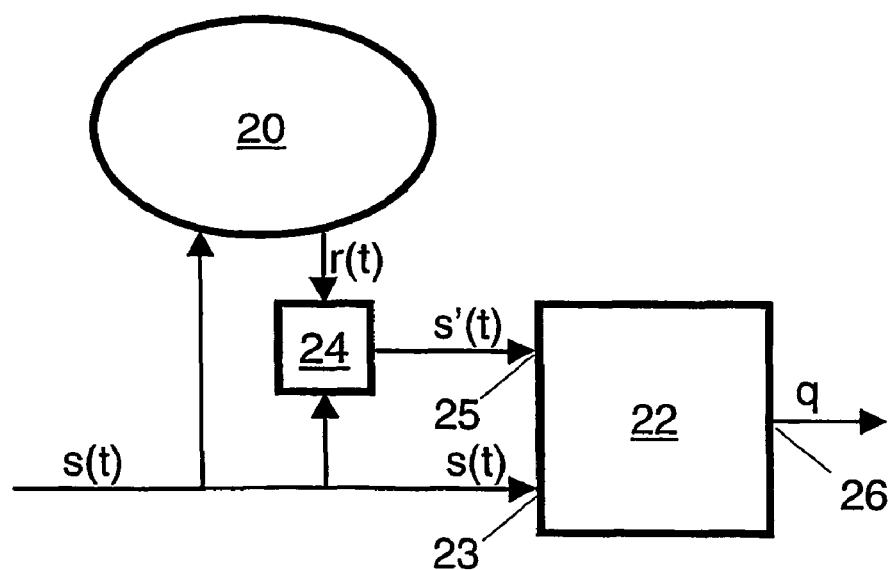
Figure 3:
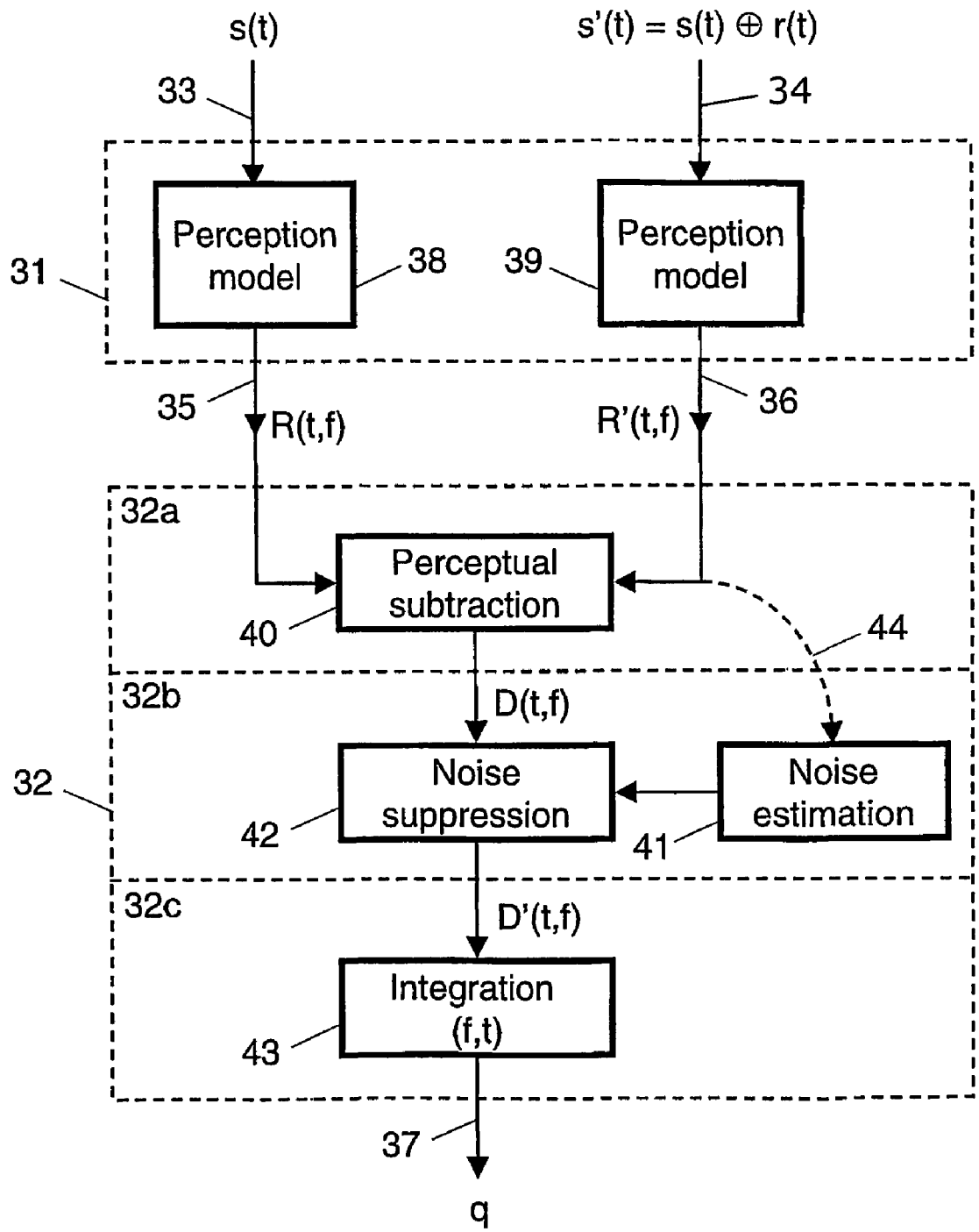
Figure 4:
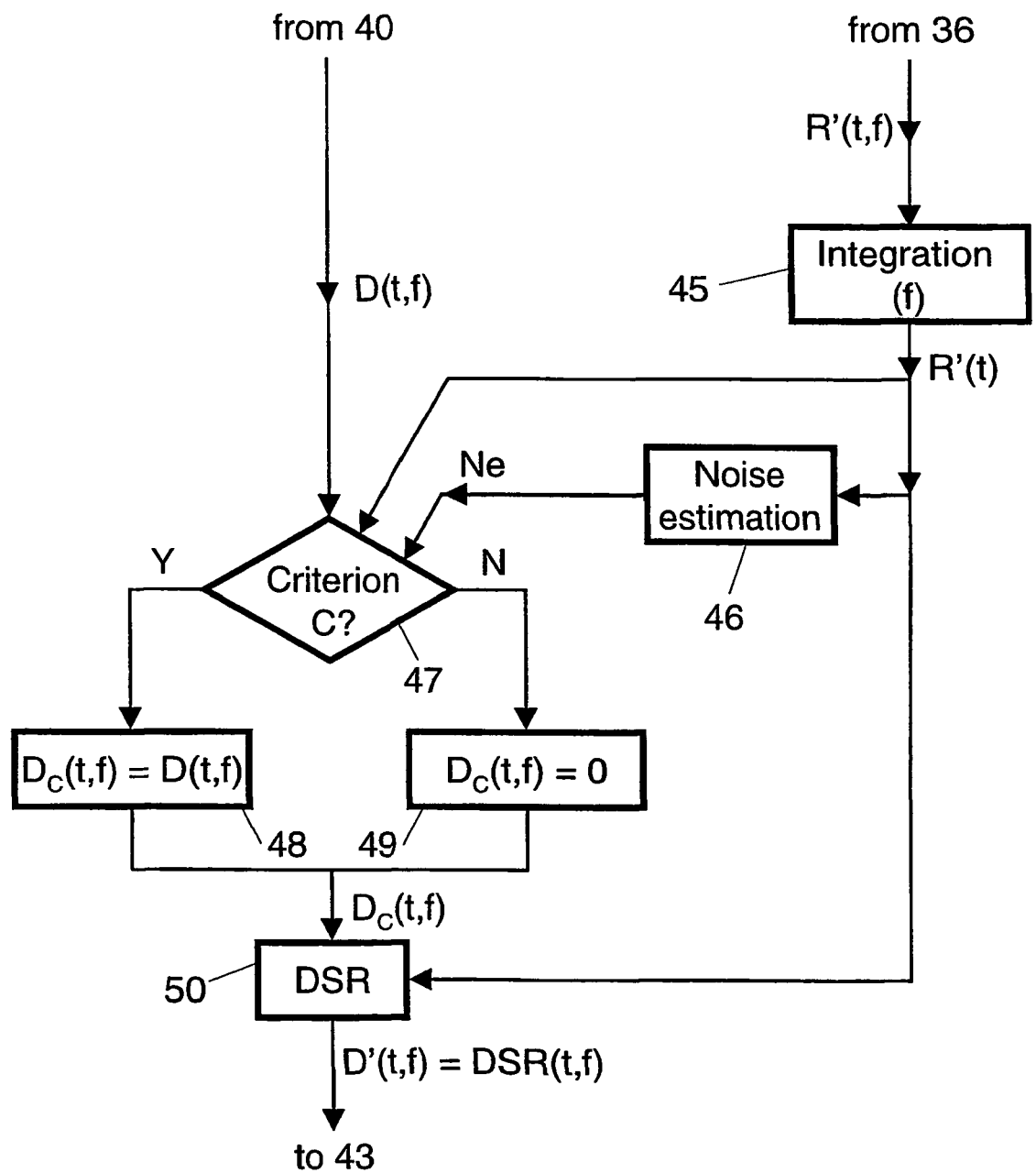
Figure 5:
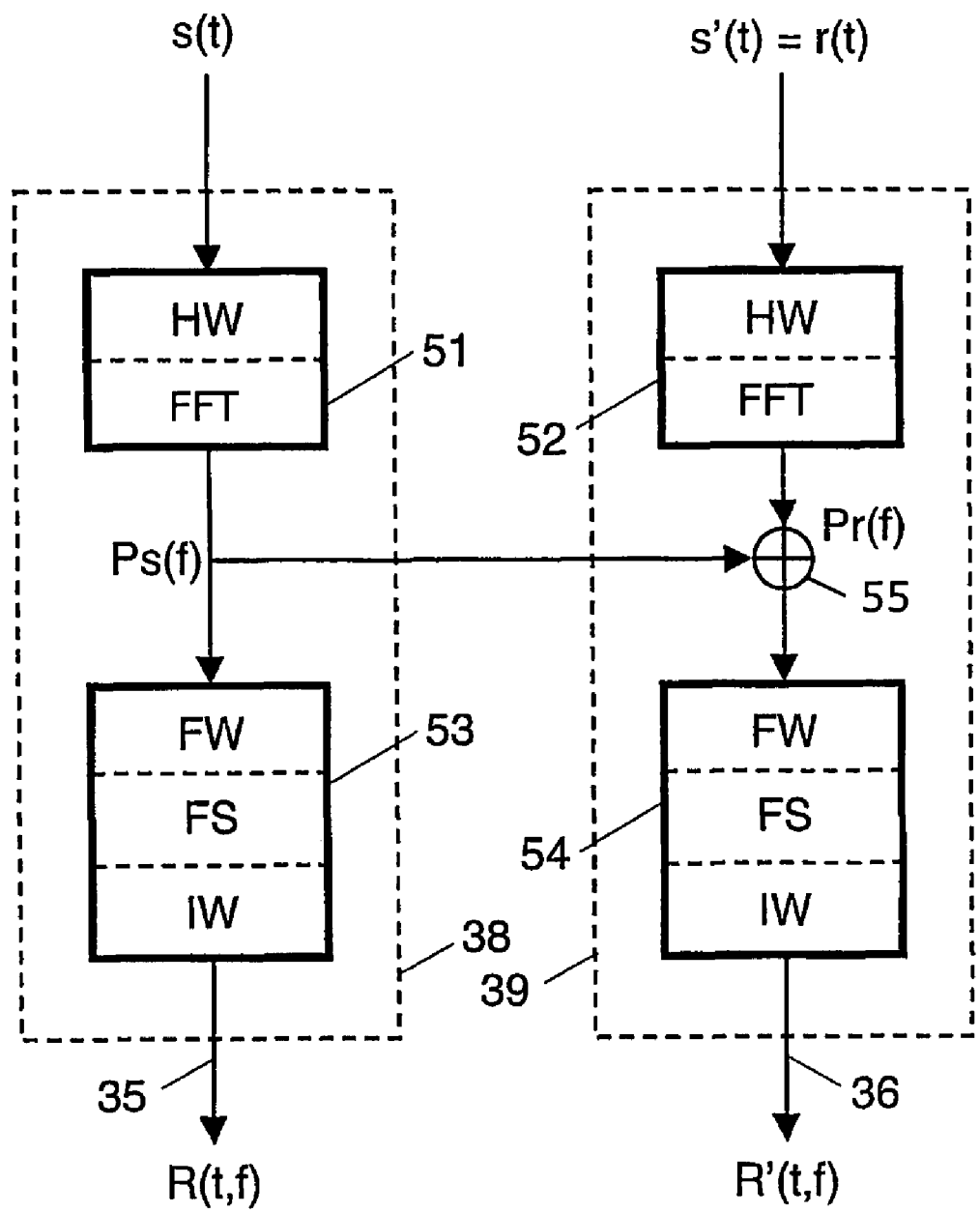

The invention will be further explained by means of the description of exemplary embodiments, reference being made to a drawing comprising the following figures:

FIG. 1 schematically shows an example of a usual telephone link in a telecommunications network;

FIG. 2 schematically shows an earlier describe set-up for measuring a talking quality of a telephone link using a known objective measurement technique for measuring a perceptual quality of speech signals;

FIG. 3 schematically shows a device for an objective measurement of a talking quality of a telephone link according to the invention to be used in the set-up of FIG. 2;

FIG. 4 shows a flow diagram of the detailed operation of a part of the device shown in FIG. 3;

FIG. 5 schematically shows a modification in a further part of the device shown in FIG. 3.

E. DESCRIPTION OF EXEMPLARY EMBODIMENTS

Delay and echo play an increasing role in the quality of telephony services because modern wireless and/or packet based network techniques, like GSM, UMTS, DECT, IP and ATM inherently introduce more delay than the classical circuit switching network techniques like SDH and PDH. Delay and echo together with the side tone determine how a talker perceives his own voice in a telephone link. The quality with which he perceives his own voice is defined as the talking quality. It should be distinguished from the listening quality, which deals with how a listener perceives other voices (and music). Talking quality and listening quality together with the interaction quality determine the conversational quality of a telephone link. Interaction quality is defined as the ease of interacting with the other party in a telephone call, dominated by the delay in the system and the way it copes with double talk situations. The present invention is related to the objective measurement of talking quality of a telephone link, and more particularly to account for the influence of noise therein.

FIG. 1 schematically shows an example of a usual telephone link established between an A subscriber and a B subscriber of a telecommunications network 10. Telephone sets 11 and 12 of the A subscriber and the B subscriber, respectively, are connected by way of two-wire connections 13 and 14 and four-wire interfaces, namely, hybrids 15 and 16, to the network 10. Through the network, the established telephone link has a forward channel including a two-wire part, i.e., two-wire connections 13 and 14, and a four-wire send part 17, over which speech signals from the A subscriber are conducted, and a return channel including a two-wire part, i.e., two-wire connections 14 and 13, and a four-wire receive part 18, over which speech signals from the B subscriber are conducted. A speech signal s striking the microphone M of the telephone set 11 of the A subscriber, is passed on, by way of the forward channel (13, 17, 14) of the telephone link, to the earphone R of telephone set 12, and becomes audible there for the B subscriber as a speech signal s" affected by the network. Each speech signal s(t) on the forward channel generally causes a returned signal r(t) which, particularly due to the presence of said hybrids, includes an electrical type of echo signal on the return channel (18, 13) of the telephone link, and this is passed on to the earphone R of the telephone set 11, and may therefore disturb the A subscriber there. Furthermore the acoustic and/or mechanical coupling of the earphone or loudspeaker signal to the microphone of the telephone set of the B subscriber may cause an acoustic type of echo signal back to the telephone set of the A subscriber, which contributes to the returned signal. In an end-to-end digital telephone link (such as in a GSM system or in a Voice-over-IP system) such acoustic echo signal is the only type of echo signal that contributes to the return signal.

Summarising a returned signal r(t) may include, at various stages in the return channel of a telephone link as caused by a speech signal s(t) in the forward channel of the telephone link:

a signal r1 representing acoustic echo;
a signal r2 representing an electrical echo possibly in combination with the acoustic echo;

a signal r3 which represents the signal r2 as affected, i.e. delayed or distorted, by the network 10;

a signal r4 which represents the signal r3 in combination with a side tone signal, and a signal r5 which is an acoustic signal derived from the signal r4, that also includes the locally generated side tone.

FIG. 2 shows schematically a set-up for measuring a talking quality of a telephone link using a known objective measurement technique for measuring a perceptual quality of speech signals, as described in reference [1]. The set-up comprises a system or telecommunications network under test 20, hereinafter for briefness' sake referred to as network 20, and a system 22 for the perceptual analysis of speech signals offered, hereinafter for briefness' sake only designated as PSQM system 22. Any talker speech signal s(t) is used, on the one hand, as an input signal of the network 20 and, on the other hand, as first input (or reference) signal of the PSQM system 22. A returned signal r(t) obtained from the network 20, which corresponds to the input talker speech signal s(t), is combined, in a combination circuit 24, with the talker speech signal s(t) to provide a combined speech signal s'(t), which is then used as a second input (or degraded) signal of the PSQM system. If necessary, the signal s(t) is scaled to the correct level before being combined with the returned signal r(t) in the combination circuit. An output signal q of the PSQM system 22 represents an estimate of the talking quality, i.e. of the perceptual quality of the telephone link through the network 20 as it is experienced by the telephone user during talking on his own telephone set. Here use may be made of signals stored on databases. These signals may be obtained or have been obtained by simulation or from a telephone set (e.g. signal r4 in the electrical domain or signal r5 in the acoustic domain) of the A subscriber in the event of an established link during speech silence of the B subscriber. The two-wire connection between the telephone subscriber access point and the four-wire interface with the network does not, or hardly, contribute to the echo component in the returned signal r(t) (of course, it does contribute to the echo component in a returned signal occurring in the return channel of the B subscriber of the telephone link). However, any such signal contribution has a short delay and, as a matter of fact, forms part of the side tone.

The signals s(t) and r(t) may also be tapped off from a four-wire part 17 of the forward channel and the four-wire part 18 of the return channel near the four-wire interface 15, respectively. This offers, as already described in reference [1], the opportunity of a permanent measurement of the talking quality in the event of established telephone links, using live traffic non-intrusively.

The system or network being tested may of course also be a simulation system, which simulates a telecommunications network.

The described technique has, however, the following problem. Since a system or network under test generally will not be ideal, any returned signal r(t) will contain also signal components not directly related to the voice of the talker, like noise present in the telephone system, noise derived from the background noise of the listener at the other side of the telephone connection, or noise derived from interfering signals. In such a case these signal components may have a so-called masking effect on the echo, which then results in an increase of the talking quality. Objective measurement systems like PSQM, however, which up to now have been developed for assessing the listening quality of speech signals, will interpret such noise components in terms of a decrease in quality. In the following, a method and a device are described which in essence imply a modification of a PSQM-like algorithm, in order to avoid the problem and to make the existing algorithm suitable for objectively measuring the talking quality with a higher correlation with a subjectively measured talking quality, when used in a set-up as shown in FIG. 2, than without the modification.

FIG. 3 shows schematically a measuring device for objectively measuring the perceptual quality of an audible signal. The device comprises a signal processor 31 and a combining arrangement 32. The signal processor is provided with signal inputs 33 and 34, and with signal outputs 35 and 36 coupled to corresponding signal inputs of the combining arrangement 36. A signal output 37 of the combining arrangement 36 is at the same time the signal output of the measuring device. The signal processor includes perception modelling means 38 and 39, respectively coupled to the signal inputs 33 and 34, for processing input signals s(t) and s'(t) and generating representation signals R(t,f) and R'(t,f) which form time/frequency representations of the input signals s(t) and s'(t), respectively, according to a perception model of the human auditory system. The representation signals are functions of time and frequency (Hz scale or Bark scale). The signal processing, as usual, is carried out frame-wise, i.e. the speech signals are split up in frames that are about equal to the window of the human ear (between 10 and 100 ms) and the loudness per frame is calculated on the basis of the perception model. Only for reasons of simplicity this frame-wise processing is not indicated in the figures.

The representation signals R(t,f) and R'(t,f) are passed to the combining arrangement 32 via the signal outputs 35 and 36. In the combining arrangement of the known PSQM-like algorithm at first a difference signal of the representation signals is determined followed by various processing steps carried out on the difference signal. The last ones of the various processing steps imply integration steps over frequency and time resulting in a quality signal q available at the signal output 37.

In case of determining a listening quality, the input signal s'(t) is an output signal of an audio- or speech signals processing or transporting system, of which the signal processing or transporting operation is assessed, while the input signal s(t), being the corresponding input signal of the system to be assessed, is used as reference signal. For determining a talking quality, however, where, as described with reference to FIG. 2, the input signal s'(t) is a combination of the signal s(t) and the returned signal r(t), the known combining arrangement should be modified.

According to the recommended PSQM-like algorithm (see reference [2], more particularly FIG. 3/P.861) the various processing steps carried out by (within) the combining arrangement, include asymmetry processing and silent interval weighting steps for modelling some perceptual effects. It is known that noise in the echo signal, especially background noise originating at the side of the B subscriber of the telephone link, has a masking effect on the echo signal, thus leading to an improvement of the subjectively perceived talking quality. Then it was realized that the presence of the steps for modelling the cognitive effects in the algorithm, however, in which noise in the echo signal will be interpreted as an introduced distortion, would lead to a deterioration of the objectively measured talking quality, and therefore could not be maintained as such.

Instead, for correctly measuring the talking quality, a step of modelling masking effects which noise present in the returned signal could have on perceived echo disturbances, is introduced. Such a modelling step could be based on a possible separation of echo components and noise components present in the returned signal r(t). However a reliable modelling could be reached in a different, simpler manner. This modelling step implies a specific noise suppression step, which in principle may be carried out on the returned signal within the perception modelling means (39 in FIG. 3), but which is preferably carried out on the difference signal, by using an estimated value for the noise. Therefore the combining arrangement 32 comprises:

in a first part 32*a*, a subtraction means 40 for perceptually subtracting the two representation signals R(t,f) and R'(t,f) received from the signal processor 31 and generating a difference signal D(t,f), in a second part 32*b*, a noise estimating means 41 for generating an estimated noise value Ne for the noise present in the input signal s'(t), and a noise suppression means 42 for deriving from the difference signal D(t,f) and the estimated noise value Ne a modified difference signal D'(t,f), and in a third part 32*c*, integration means 43 for integrating the modified difference signal D'(t,f) successively to frequency and time and generating the quality signal q.

The estimated noise value Ne may be a predetermined value, e.g., derived from the type of telephone link, or is preferably obtained from one of the representation signals, i.e. R'(t,f), which is visualized in FIG. 3 by means of a broken dashed line between the signal output 36 with a signal input 44 of the noise estimation means 41. The representation signals R(t,f) and R'(t,f) are as usual loudness density functions of the reference and degraded speech signals s(t) and s'(t), respectively. The output signal of the subtraction means 40, i.e., D(t,f), represents the signed difference between the loudness densities of the degraded (i.e., distorted by the presence of echo, side tone and noise signals in the returned signal) and the reference signal (i.e., the original talker speech signal), preferably reduced by a small perceptual correction, i.e., a small density correction for so-called internal noise.

The resulting difference signal D(t,f), which is in fact a loudness density function, is subjected to a background masking noise estimation. The key idea behind this is that, because talkers during a telephone call will always have silent intervals in their speech, during such intervals (of course after the echo delay time) the minimum loudness of the degraded signal over time is almost completely caused by the background noise. Since the speech signal processing is carried out in frames, this minimum may be put equal to a minimum loudness density Ne found in the frames of the representation signal R'(t,f). This minimum Ne can then be used to define a threshold value T(Ne) for setting the content of all frames of the difference signal D(t,f), that have a loudness below this threshold, to zero, leaving the content of the other frames unchanged. The set-to-zero frames and the unchanged frames together constitute a signal from which the modified difference signal D'(t,f), the output signal of the noise suppression means 42, is derived (see below). Consequently, the standard Hoth noise background masking noise, used in the main step of the PSQM-like algorithm of deriving the representation signals, has to be omitted from the algorithm.

FIG. 4 shows schematically, in further detail and by means of a flow diagram, the modelling step as carried out on the difference signal D(t,f) by the noise suppression means 42 using the estimated noise value Ne produced by the noise estimating means 41. Again it is emphasised that, although for sake of simplicity only not indicated in the figures, the signal processing is understood to be framewise. The flow diagram includes the following boxes:

box 45 indicating a step of integrating the representation signal R'(t,f), as produced by the signal processor 31 via output 36, over frequency, resulting in a loudness degraded signal R'(t);

box 46 indicating a step of determining the estimated noise value Ne for the noise present in the loudness degraded signal R'(t), Ne being equal to the minimum value of the loudness found in the loudness degraded signal R'(t);

boxes 47, 48 and 49 indicating a step of subjecting the difference signal D(t,f) to a criterion C by means of which from the difference signal a thresholded difference signal $D_c(t,f)$ is derived, box 48 indicating that $D_c(t,f)=D(t,f)$ for frames in which the loudness of the frames in the loudness degraded signal R'(t) suffices to the criterion and box 49 indicating that $D_c(t,f)=0$ for frames in which the loudness of the frames in the loudness degraded signal R'(t) does not suffice to the criterion C;

box 50 indicating a step of determining from the thresholded difference signal $D_c(t,f)$ the modified difference signal D'(t,f) by calculating a distortion loudness to signal loudness ratio (DSR) of the thresholded difference signal $D_c(t,f)$ and the loudness degraded signal R'(t), i.e. D'(t,f)=DSR(t,f).

Experimentally, a suitable criterion C appeared to be that the loudness of the frames in the loudness degraded signal R'(t) is larger than or equal to the threshold value T(Ne) or not, choosing said threshold value to be a constant factor $C_f$ times the estimated value Ne, i.e., $T(Ne)=C_f Ne$. A suitable value for the constant factor appeared to be $C_f=1.6$.

In calculating the DSR of the difference signal, a clipping is carried out by introducing a threshold on the signal loudness, below which the signal loudness is set to that threshold. In an optimization, a threshold value of 4 Sone was found.

Finally, the modified difference signal D'(t,f) is integrated by means of the integration means 43 at first over frequency using an Lp norm (i.e., the generally known Lebesgue p-averaging function or Lebesgue p-norm) with p=0.8, and over time using an Lp norm with p=6, resulting in the output value q for the talking quality.

The quality output values of a thus modified objective measurement method and device for assessing the talking quality, as experimentally obtained for seven databases of test speech signals, showed high correlations (above 0.93) with the mean opinion scores (MOS) of the subjectively perceived talking quality.

For the measuring of the talking quality it is necessary that the representation signal R'(t,f) is a representation of the signal combination of the talker speech signal and the returned signal. To realize this, however, it is not necessary that the degraded signal s'(t) is a signal combination of these two signals as indicated in FIG. 2 (signal combinator 24) and in FIG. 3 (s'(t)=s(t)⊕r(t)). It is also possible to use the returned signal (r(t)) as the degraded signal (s'(t)) and to obtain an intermediate signal in an intermediate stage of processing the reference signal, as carried out by the perception modelling means 38, which then is combined with a corresponding intermediate signal (Ps'(f)) obtained in a corresponding intermediate stage of processing the degraded signal, as carried out by the perception modelling means 39. Preferably, the intermediate signal is a Fast Fourier Transform power representation (Ps(f)) of the reference speech signal (s(t)). This modification is shown schematically in FIG. 5 more in detail. The perceptual modelling means 38 and 39 carry out in a first stage of processing as usual (see reference [2]), respectively indicated by boxes 51 and 52, a step of determining a Hanning window (HW) followed by a step of determining a Fast Fourier Transform (FFT) power representation in order to produce the intermediate signals Ps(f) and Pr(f), which are FFT power representations of the talker speech signal s(t) and the degraded signal s'(t) which now equals the returned signal r(t), respectively. In a second stage of processing, respectively indicated by boxes 53 and 54, a step of frequency warping (FW) to pitch scale is carried out followed by steps of frequency smearing (FS) and intensity warping (IW), in order to produce the representation signals R(t,f) and R'(t,f). Between the first and second stages, as indicated by the boxes 52 and 54, an intermediate signal addition of the intermediate signals Ps(f) and Pr(f), indicated by signal adder 55, is carried out, the intermediate signal sum in addition being the input of the second processing stage (box 54). Before the intermediate signal addition can be applied, the intermediate signal P(s(f)) has to be scaled to the correct level as usual.

Consequently, when using such an intermediate signal addition (Ps(f)⊕Pr(f)) inside the perception modelling means, instead of the external addition (s'(t)=s(t)⊕r(t)), the combination circuit 24 becomes superfluous. In case a device as described with reference to FIG. 3, having included the modification as described with reference to FIG. 5, is used directly in a telephone link, in a way as already described in reference [1], then the input ports 33 and 34 of the device may be directly coupled to the four-wire parts 17 and 18 of the forward and return channel, respectively, of a telephone link.

The invention claimed is:

1. A method for measuring talking quality of a telephone link in a telecommunications network, the method comprising the steps of:
   subjecting a degraded speech signal s'(t), with respect to a talker speech signal s(t) and to an objective measurement technique, so as to produce a quality signal (q), wherein the degraded speech signal comprises a returned signal r(t) corresponding to a signal occurring in a return channel of the telephone link during transmission of the talker speech signal in a forward channel of the telephone link, wherein the subjecting step comprises the steps of:
      generating, in response to the degraded speech signal, a first representation signal (R'(t,f)), the first representation signal representing a combination of the talker speech signal and the returned signal;
      generating, in response to the talker speech signal, a second representation signal (R(t,f)); and
      combining the first and second representation signals so as to produce the quality signal, wherein the combining step comprises the steps of:
         subtracting the first representation signal from the second representation signal so as to produce a difference signal (D(t,f));
         producing an estimated value (Ne) of loudness of the noise present in the returned signal;
         suppressing noise in the difference signal through use of the estimated value (Ne) so as to produce a modified difference signal (D'(t,f)); and
         integrating the modified difference signal, with respect to frequency and time, so as to produce the quality signal.

2. The method according to claim 1 wherein the noise suppressing step comprises the steps of:
   deriving from the estimated value (Ne) a loudness criteria (C);
   setting distortions in a loudness domain of the difference signal, which do not satisfy the criteria, to zero in a loudness domain of a thresholded difference signal ($D_c(t,f)$); and
   deriving the modified difference signal (D'(t,f)) by calculating a distortion loudness to signal loudness ratio (DSR(t,f)) of the thresholded difference signal ($D_c(t,f)$) with respect to a loudness degraded signal (R'(t)) derived from the first representation signal (R'(t,f)).

3. The method according to claim 2 further comprising the step of deriving the estimated value of noise loudness from the first representation signal (R'(t,f)).

4. The method according to claim 3 wherein the degraded speech signal (s'(t)) is a combination of the talker speech signal (s(t)) and the returned signal (r(t)).

5. The method according to claim 3 wherein the returned signal (r(t)) is used as the degraded signal (s'(t)), and a first intermediate signal (Ps(f)) obtained during an intermediate stage of the second representation signal generating step is combined with a corresponding second intermediate signal (Pr(f)) obtained during a corresponding intermediate stage of the first representation signal generating step.

6. The method according to claim 5 wherein the first intermediate signal is a Fast Fourier Transform power representation (Ps(f)) of the talker speech signal (s(t)).

7. The method according to claim 6 wherein the talker speech signal and the returned signal are taken from an established telephone link.

8. A device for measuring talking quality of a telephone link in a telecommunications network, the device comprising:
   measurement means for subjecting a degraded speech signal s'(t), with respect to a talker speech signal s(t) and to an objective measurement technique, so as to produce a quality signal (q), wherein the degraded speech signal comprises a returned signal r(t) corresponding to a signal occurring in a return channel of the telephone link during transmission of the talker speech signal in a forward channel of the telephone link, wherein the measurement means comprises:
      means for generating, in response to the degraded speech signal, a first representation signal (R'(t,f)), the first representation signal representing a combination of the talker speech signal and the returned signal;
      means for generating, in response to the talker speech signal, a second representation signal (R(t,f)); and
      means for combining the first and second representation signals so as to produce the quality signal, wherein the combining means comprises:
         means for subtracting the first representation signal from the second representation signal so as to produce a difference signal (D(t,f));
         means for producing an estimated value (Ne) of loudness of the noise present in the returned signal;
         means for suppressing noise in the difference signal through use of the estimated value (Ne) so as to produce a modified difference signal (D'(t,f)); and
         means for integrating the modified difference signal, with respect to frequency and time, so as to produce the quality signal.

9. The device according to claim 8 wherein the device further comprises a combiner for combining the talker speech signal (s(t)) and the returned signal (r(t)) so as to form the degraded signal (s'(t)).

10. The device according to claim 8 wherein the device further comprises means for combining a first intermediate signal (Ps(f)) obtained in an intermediate stage of the second representation signal generating means with a corresponding second intermediate signal (Pr(f)) obtained in a corresponding intermediate stage of the first representation signal generating means, the degraded signal (s'(t)) being the returned signal (r(t)).

11. The device according to claim 10 wherein the intermediate signal combining means is included in the first representation signal generating means after means for performing a Fast Fourier Transform in response to the degraded signal.

* * * * *